H. G. EMERY & M. C. FULLER.

Collars.

No. 4,916.

Reissued May 28, 1872.

Witnesses:

Fredk. Astor

Charles E. Chinn

Inventors.

H. Godfrey Emery &
M. C. Fuller by
Dyer, Beadle & Co.
attys.

AM. PHOTO-LITHOGRAPHIC CO. N.Y. (OSBORNE'S PROCESS.)

UNITED STATES PATENT OFFICE.

HARRIET GODFREY EMERY AND MARGARET CATE FULLER, OF BOSTON, MASSACHUSETTS.

IMPROVEMENT IN COLLARS.

Specification forming part of Letters Patent No. 105,442, dated July 19, 1870; reissue No. 4,916, dated May 28, 1872.

*To all whom it may concern:*

Be it known that the following is a full, clear, and exact description of the invention of H. G. EMERY and M. C. FULLER, of Boston, Massachusetts, in Collars, reference being had to the accompanying drawing and to the letters of reference marked thereon, like letters indicating like parts wherever they occur.

This invention has for its object the production of an improved collar, which, by reason of its peculiar construction, shall be capable when being worn of always retaining its place without being pinned or otherwise secured except by the simple button or other fastening in front. The details of construction will be fully described hereinafter.

Figure 1:
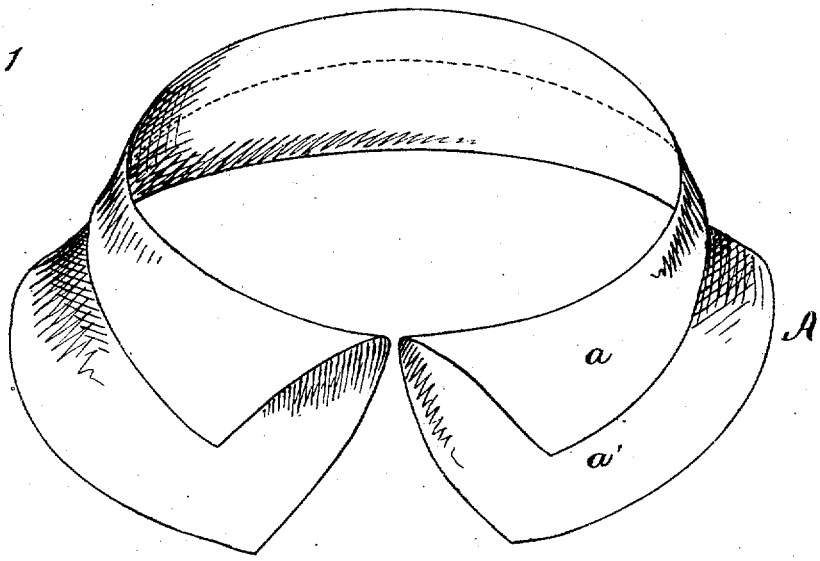
Figure 2:
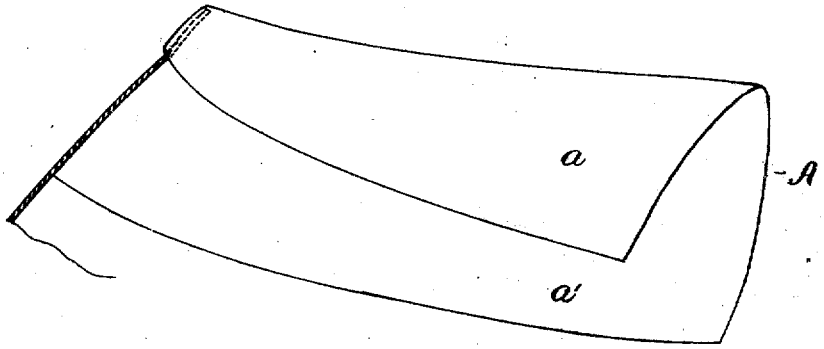

In the drawing, Figure 1 represents a perspective view of our improved collar, and Fig. 2 a side view of the same.

To enable others skilled in the art to make and use our invention, we will now proceed to describe fully the construction of the same.

A represents the collar, consisting of the parts *a a'*, the former of which, constituting the collar proper, is adapted to turn down over the outer garment when in place. The latter portion *a'* is adapted to be slipped under the outer garment, as indicated in Fig. 2. By means of this peculiar construction the collar is, as it were, clasped onto the upper edge of the garment, and is thus securely held in place. This result, it will be understood, arises from the employment of the turned-down collar in connection with the portion *a'*, for in this case the buttoning or fastening of the collar in front necessarily draws the two parts tightly together and clasps them to the garment.

We are aware that appendages somewhat similar to the portion *a'* have been employed in connection with stand-up collars, but never as herein described, for in such cases the two parts have never been so constructed that by being fastened to the garment by one fastening in front the collar would be kept firmly and comfortably in position by the outer part clasping the under part or the garment between them, but have required other fastenings than the one in front to keep them in position. The collar described will securely retain its place under all circumstances without other fastening than that employed in front. It is especially adapted for boys' use, the part *a* being adapted to be worn over the jacket and the part *a'* beneath it. It may of course, however, be adapted to the use of ladies and others.

Having thus fully described our invention, what we claim as new, and desire to secure by Letters Patent, is—

The collar described, consisting of the parts *a a'*, substantially as and for the purpose set forth.

H. GODFREY EMERY.
M. C. FULLER.

Witnesses:
BENJ. DEAN,
B. G. FULLER.